(12) United States Patent (10) Patent No.: US 8,780,436 B2
Ellis-Monaghan et al. (45) Date of Patent: Jul. 15, 2014

(54) MICROMIRRORS FOR COLOR ELECTRONIC PAPER AND DESIGN STRUCTURES FOR SAME

(75) Inventors: John J. Ellis-Monaghan, Grand Isle, VT (US); Jeffrey P. Gambino, Westford, VT (US); Kirk D. Peterson, Jericho, VT (US); Jed H. Rankin, Richmond, VT (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 13/343,395

(22) Filed: Jan. 4, 2012

(65) Prior Publication Data

US 2013/0170012 A1 Jul. 4, 2013

(51) Int. Cl.
*G02B 26/00* (2006.01)
(52) U.S. Cl.
USPC .......................................................... 359/291

(58) Field of Classification Search
USPC .......... 359/290–292, 223, 224, 237, 316, 619
See application file for complete search history.

(56) References Cited

U.S. PATENT DOCUMENTS

| 5,612,736 | A | * | 3/1997 | Vogeley et al. | 348/207.99 |
| 5,818,627 | A | * | 10/1998 | Perlo et al. | 359/292 |
| 5,953,103 | A | * | 9/1999 | Nakamura | 355/32 |
| 6,639,572 | B1 | | 10/2003 | Little et al. | |
| 7,573,633 | B2 | * | 8/2009 | Ishii et al. | 359/292 |
| 2008/0024427 | A1 | | 1/2008 | Kuo et al. | |

* cited by examiner

*Primary Examiner* — Tuyen Tra
(74) *Attorney, Agent, or Firm* — Schmeiser, Olsen & Watts; Anthony Canale (57) ABSTRACT

Direct view color displays and design structures of direct view color displays. The direct view displays include micromirrors having un-tilted and tilted states and multiple color filters or color reflectors.

20 Claims, 11 Drawing Sheets

MICROMIRRORS FOR COLOR ELECTRONIC PAPER AND DESIGN STRUCTURES FOR SAME

FIELD OF THE INVENTION

The present invention relates to the field of direct-view displays and more specifically, it relates to multistate micromirrors for an electronic paper color display and design structures for multistate micromirrors for electronic paper color displays.

BACKGROUND

Direct-view displays produce images that can be viewed directly without the aid of magnification or projection. Current direct-view displays are either black and white, have relatively high power usage or have poor contrast ratio. Accordingly, there exists a need in the art to mitigate the deficiencies and limitations described hereinabove.

SUMMARY

A first aspect of the present invention is a direct view display, comprising: an array of micromirrors and first and second filters formed on a top surface of a substrate, each micromirror of the array of micromirrors having a top surface that reflects light, each micromirror of the array of micromirrors positioned between a respective first filter that absorbs white light and a respective second filter that transmits color light of selected wavelengths, each micromirror of the array of micromirror (i) having a non-tilted first state that reflects incident light back toward the source of the incident light, (ii) tiltable to a second state to reflect incident light into the first filters and (iii) tiltable to a third state to reflect incident light through the second filters.

A second aspect of the present invention is a direct view display, comprising: an array of micromirrors and first filters formed on a top surface of a substrate each micromirror of the array of micromirrors having a top surface that reflects light and positioned between a corresponding pair of first filters that absorb white light; and an array of second filters that transmits color light of selected wavelengths, each second filter of the array of second filters positioned over the top surfaces of respective micromirrors of the array of micromirrors, each of the micromirrors of the array of micromirrors (i) having a non-tilted first state that reflects incident light back toward the source of the incident light through a respective second filter and (ii) tiltable to a second state to reflect incident light into a respective first filter.

A third aspect of the present invention is a direct view display, comprising an array of micromirror pixels each micromirror pixel of the array of micromirror pixels comprising: a micromirror formed on a top surface of a substrate, the micromirror having a top surface that reflect light and having n sides, where n is equal to or greater than three; and n reflectors formed on a top surface of a substrate, each of the n reflectors positioned proximate to a respective side of the micromirror, each of the n reflectors independently configured to reflect color light of selected wavelengths or absorb white light, each micromirror of the array of micromirrors (i) having a non-tilted first state that reflects incident light back toward the source of the incident light and (ii) tiltable to n additional states to reflect incident light onto one of the n reflectors in each of the n states.

A fourth aspect of the present invention is a design structure, comprising design data encoded on a machine-readable data storage medium in a hardware description language (HDL), the design data comprising elements that when processed in a computer-aided design system generates a machine-executable representation of a direct view display, wherein the direct view display comprises: an array of micromirrors and first and second filters formed on a top surface of a substrate, each micromirror of the array of micromirrors having top surfaces that reflect light, each micromirror of the array of micromirrors positioned between a respective first filter that absorbs white light and a respective second filter that transmits color light of selected wavelengths, each micromirror of the array of micromirrors (i) having a non-tilted first state that reflects incident light back toward the source of the incident light, (ii) tiltable to a second state to reflect incident light into the first filters and s(iii) tiltable to a third state to reflect incident light through the second filters.

A fifth aspect of the present invention is a design structure, comprising design data encoded on a machine-readable data storage medium in a hardware description language (HDL), the design data comprising elements that when processed in a computer-aided design system generates a machine-executable representation of a direct view display, wherein the direct view display comprises: an array of micromirrors and first filters formed on a top surface of a substrate each micromirror of the array of micromirrors having a top surface that reflects light and positioned between a corresponding pair of first filters that absorb white light; and an array of second filters that transmits color light of selected wavelengths, each second filter of the array of second filters positioned over the top surfaces of respective micromirrors of the array of micromirrors, each of the micromirrors of the array of micromirrors (i) having a non-tilted first state that reflects incident light back toward the source of the incident light through a respective second filter and (ii) tiltable to a second state to reflect incident light into a respective first filter.

A sixth aspect of the present invention is a design structure, comprising design data encoded on a machine-readable data storage medium in a hardware description language (HDL), the design data comprising elements that when processed in a computer-aided design system generates a machine-executable representation of a direct view display, wherein the direct view display comprises: an array of micromirror pixels each micromirror pixel of the array of micromirror pixels comprising: a micromirror formed on a top surface of a substrate, the micromirror having a top surface that reflect light and having n sides, where n is equal to or greater than three; and n reflectors formed on a top surface of a substrate, each of the n reflectors positioned proximate to a respective side of the micromirror, each of the n reflectors independently configured to reflect color light of selected wavelengths or absorb white light, each micromirror of the array of micromirrors (i) having a non-tilted first state that reflects incident light back toward the source of the incident light and (ii) tiltable to n additional states to reflect incident light onto one of the n reflectors in each of the n states.

These and other aspects of the invention are described below.

BRIEF DESCRIPTION OF THE DRAWINGS

The features of the invention are set forth in the appended claims. The invention itself, however, will be best understood by reference to the following detailed description of illustrative embodiments when read in conjunction with the accompanying drawings, wherein:

FIG. 5A is a cross-sectional view and

DETAILED DESCRIPTION

Figure 1:
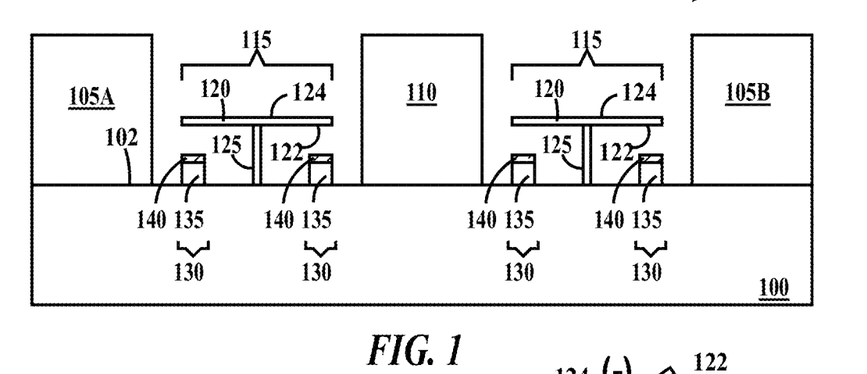
FIG. 1 is a cross-section through a tri-state color micromirror pixel according to an embodiment of the present invention.

FIG. 1 is a cross-section through a tri-state color micromirror pixel according to an embodiment of the present invention. In FIG. 1, a micromirror pixel 90 includes a substrate 100 having a top surface 102. Formed on top surface 102 are black filters 105A and 105B and a color (e.g., red, blue, green, yellow, etc.) filter 110. Between black filter 105A and color filter 110 and between color filter 110 and black filter 105B are respective electrically conductive micromirror assemblies 115. Each micromirror assembly 115 includes a micromirror 120 having a bottom surface 122 and a reflective (to visible light) top surface 124. Micromirror 120 is supported by and connected to top surface 102 of substrate 100 by a vertical (i.e., perpendicular to top surface 102 of substrate 100), flexible and electrically conductive flexible member 125 having a first end attached to bottom surface 122 of micromirror 120 and a second and opposite end attached to substrate 100. Each micromirror assembly 115 also includes at least a pair of electrodes 130 under opposite sides of micromirrors 120. Electrodes 130 include electrically conductive elements 135 and optional dielectric layers 140 formed on conductive elements 135 between the conductive elements and bottom surface 122 of micromirrors 120. In one example, substrate 100 is a semiconductor (e.g., silicon) substrate. In one example, substrate 100 is a dielectric (e.g., ceramic) substrate. In one example, black filters 105A and 105B and color filter 110 are formed from transparent colored photoresist (e.g., photoresist to which dye has been added or absorb certain wavelengths of light due to the chemical structure of the photoresist polymer). Black filters 105A and 105B absorb white light (e.g., are opaque to white light) and color filter 110 transmits light of the color of the filter (i.e., transmit light of selected wavelengths). The light transmitted by color filter 110 may be a single wavelength or a range of wavelengths. Micromirrors 120 are tri-state micromirrors in that they may be in a first un-tilted position (as, for example, in FIG. 1 and FIG. 6A) where top surfaces 124 of micromirrors 120 are parallel to top surface 102 of substrate 100, a second state where top surface 124 of micromirrors 120 are tilted toward black filters 105A and 105B (as, for example, in FIG. 6B) or a third position where top surface 124 of micromirrors 120 are tilted toward color filter 110 (as, for example, in FIG. 6C).

Figure 2A:
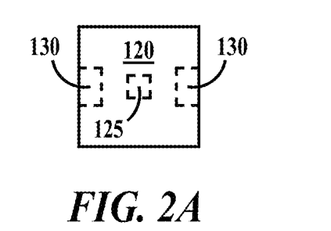
FIG. 2A is a top view of the tri-state micromirror structure.
Figure 2B:
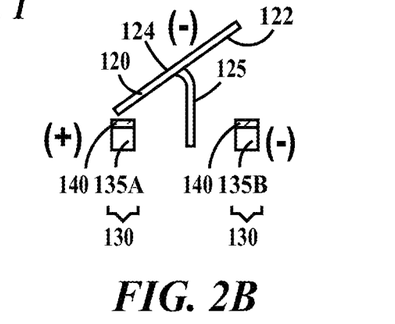
FIG. 2B is a side view of the tri-state micromirror structure of FIG. 2A illustrating a deflected state of the micromirror.

FIG. 2A is a top view of the tri-state micromirror structure and FIG. 2B is a side view of the tri-state micromirror structure of FIG. 2A illustrating a deflected state of the micromirror. In FIG. 2A, an electrically conductive flexible member 125 is positioned in the center of micromirror 130 and electrode assemblies 130 are positioned under opposite sides of micromirror 120. In one example, flexible member 125 comprises a metal, examples of which include but are not limited to aluminum, copper, gold, tungsten, titanium and tantalum. Electrode assemblies may be aligned to the edges of the micromirror (as illustrated in FIG. 2A), straddle the edge of the micromirror, or be placed completely within the perimeter of the micromirror and not aligned to the edge of the micromirror. Electrode assemblies may be positioned along a line running through the center of the micromirror, or there may be pairs of electrode assemblies proximate to the corners of the micromirrors. There may be two or more electrode assemblies under a given side of a micromirror to avoid distorting the micromirror when voltage is applied to the electrode assemblies to tilt the micromirror away from its un-tilted position (where the top surface of the micromirror is parallel to top surface 102 of substrate 100, see FIG. 1). Electrode assemblies may have a length less than the length of the side of the mirror they are positioned proximate to or may have a length equal to or greater than the length of the side of the mirror they are positioned proximate to.

In FIG. 2B, micromirror 120 is tilted to the left by applying a positive voltage to electrode 135A and a negative voltage to micromirror 120 (through flexible member 125) and to electrode 135B. Note that flexible member 125 bends to allow micromirror 120 to tilt. Alternatively, a negative voltage may be applied to electrode 135A and positive voltage applied to micromirror 120 and electrode 135B. While electrode 135B may be allowed to float, it is preferred that the same voltage be applied to electrode 135B as is applied to micromirror 120. Similarly, micromirror 120 may be tilted to the right by applying a positive voltage to electrode 135B and a negative voltage to micromirror 120 (through flexible member 125) and to electrode 135A. Dielectric layers 140 prevent the shorting of mirror 120 to electrodes 135A and 135B. In the un-tilted state it is preferred that a negative voltage be applied to micromirror 120, electrode 135A and electrode 135B to avoid switching states due to power supply noise, electrostatic charging, etc. In one example, the negative voltage is defined as zero volts. In one example, the negative voltage is ground. In one example, the positive and negative voltages are derived respectively from the positive and negative terminals of a DC (direct current) power supply.

Figure 3A:
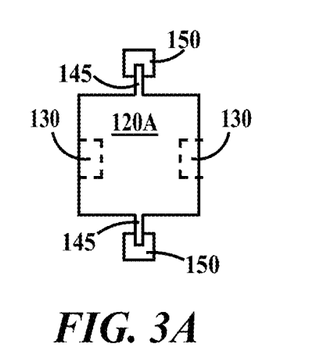
FIG. 3A is a top view of an alternative tri-state micromirror structure.
Figure 3B:
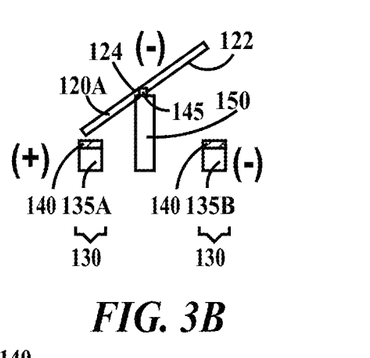
FIG. 3B is a side view of the tri-state micromirror structure of FIG. 3A illustrating a deflected state of the alternative micromirror.

FIG. 3A is a top view of an alternative tri-state micromirror structure and FIG. 3B is a side view of the tri-state micromirror structure of FIG. 3A illustrating a deflected state of the alternative micromirror. In FIGS. 3A and 3B, flexible member 125 (see FIGS. 2A and 2B) are replaced with electrically conductive torsion bars 145 on opposite sides of micromirror 120 with each torsion bar supported by a respective electrically conductive flexible member. Tilting of micromirror 120 is achieved as described supra with reference to FIG. 2A. When tilting voltages are applied, torsion bars 145 twist. When no voltage or the same voltage is applied to electrodes 135A, 135B, and 120, micromirror 120, torsion bar 145 and support members 150, torsion bars return to their normal untwisted state and micromirror 120 returns to its horizontal state. In one example, torsion bars 145 are integral with micromirror 120. In one example, torsion bars 145 are separate from but attached to micromirror 120.

Figure 4:
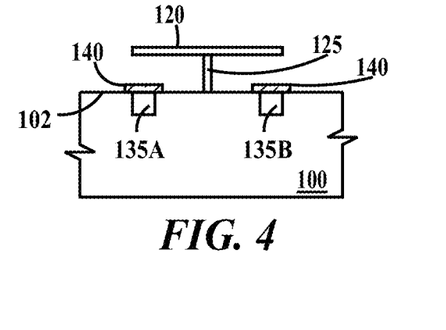
FIG. 4 illustrates an alternative arrangement of deflection electrodes.

FIG. 4 illustrates an alternative arrangement of deflection electrodes. In FIG. 4, electrodes 135A and 135B are recessed into substrate 100. While recessed electrodes are illustrated with a tri-state micromirror using a vertical flexible member, recessed electrodes may be used with tri-state micromirror assemblies using torsion bar members.

Figure 5A:
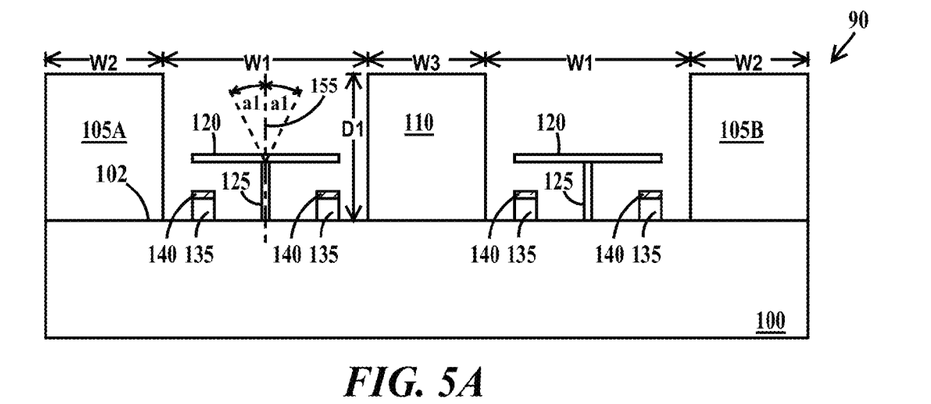
Figure 5B:
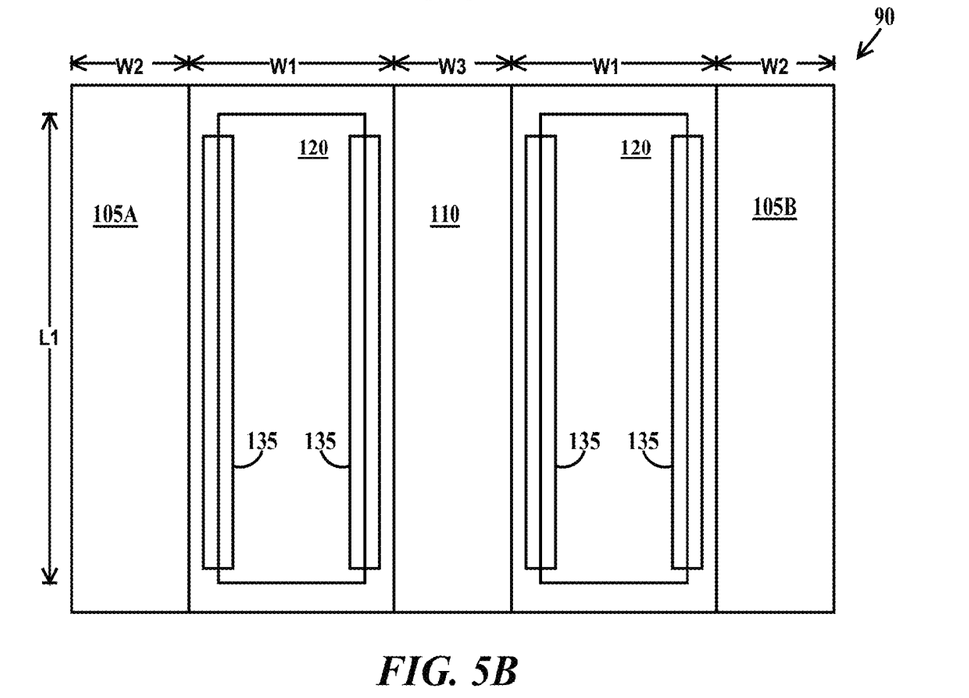
FIG. 5B is a plan view illustrating dimensions of the tri-state color micromirror pixel of FIG. 1.

FIG. 5A is a cross-sectional view and FIG. 5B is a plan view illustrating dimensions of the tri-state color micromirror pixel of FIG. 1. In FIG. 5A, black filters 105A and 105B and color filter 110 have a depth D1 and a viewing angle a1 about an axis perpendicular to top surface 102 of substrate 100 and passing through the center of micromirrors 120. In one example, D1 is less than about 20 micron. In one example, a1 is between about 20° and about 30°. In FIGS. 5A and 5B black filters 105A and 105B have a width W2 and color filter 110 has a width W3. In one example W2=W3. In one example, W1 is less than about 20 micron. In FIG. 5B, micromirrors have a length L1. Micromirror pixel 90 has a pixel width equal to W1+W2+W1 and a pixel length L1. In one example, L1 is about equal to W1+W3+W1 making a square pixel. In FIG. 5B, electrodes 135 are illustrated, by way of example, as extending along the most of the length of micromirrors 120.

Figure 6A:
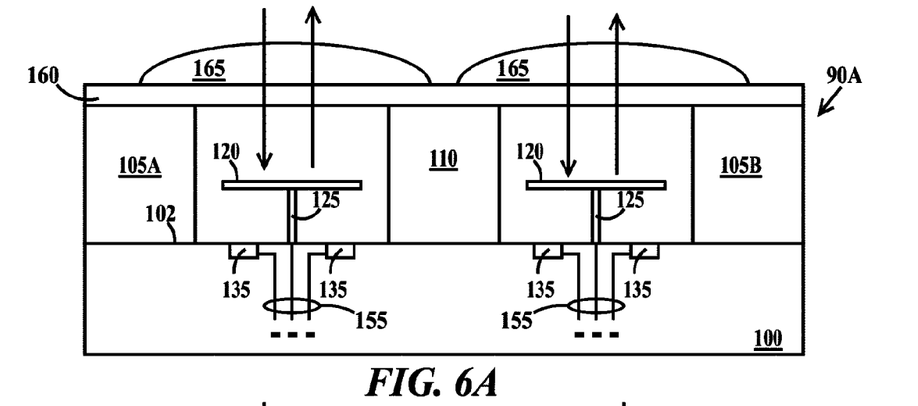
FIGS. 6A, 6B and 6C illustrate respectively, first, second and third states of the tri-state color micromirror pixel of FIG. 1.
Figure 6B:
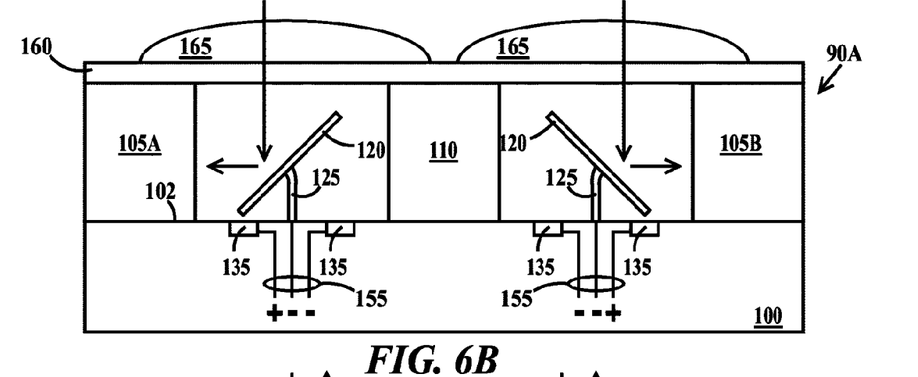
Figure 6C:
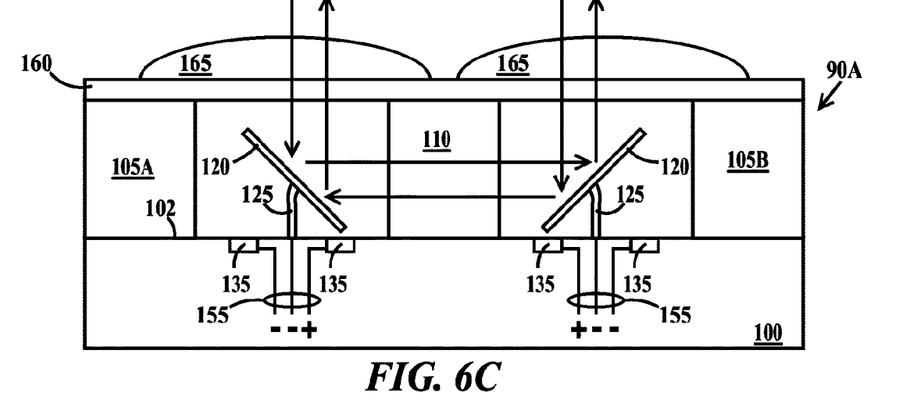

FIGS. 6A, 6B and 6C illustrate respectively, first, second and third states of the tri-state color micromirror pixel of FIG. 1. Micromirror pixel 90A of FIGS. 6A, 6B and 6C are similar to the micromirror pixel of FIG. 1 except for the presence of wires 155, transport cover plate 160 and optional micro-lenses 165 and electrodes 135 are recessed. Also, optional dielectric layer 140 (see FIG. 4) is not present. Wires 155 connect to electrodes 135 and flexible member 125. While wires 155 are illustrated as within substrate 100, wires 155 may be formed on top surface 102 of substrate 100. Micro-lenses 165 preserve the ambient light to give better contrast than a pixel without micro-lenses.

In FIG. 6A, the same voltage (e.g., a negative voltage) is applied to electrodes 135 and flexible member 125 so micromirrors are in a first state parallel to top surface 102 of substrate 100. In the first state, white light entering micromirror pixel 90A is reflected back as white light. The pixel appears white to the viewer. More generally, in the first state light entering micromirror pixel 90A is reflected back without changing the color of the light.

In FIG. 6B, the same first voltage (e.g., a negative voltage) is applied to electrodes 135 closest to color filter 110 and flexible member 125 and second different second voltage (e.g., a positive voltage) is applied to electrodes 135 closet to black filters 105A and 105B so micromirrors are in a second state tilted toward black filters 105A and 105B. In the second state, white light entering micromirror pixel 90A is absorbed by black filters 105A and 105B and little to no white light is reflected back. The pixel appears black to the viewer. More generally, in the second state light entering micromirror pixel 90A is not reflected back or is reflected back at a greatly reduced intensity so as to appear black or grey.

In FIG. 6C, the same first voltage (e.g., a negative voltage) is applied to electrodes 135 closet to black filters 105A and 105B and flexible member 125 and a different second voltage (e.g., a positive voltage) is applied to electrodes 135 closet to color filter 110 so micromirrors are in a third state tilted toward color filter 110B. In the third state, white light entering micromirror pixel 90A passes through is reflected by one micromirror 120 passes through color filter 110 and is reflected back as light of the color of the color filter by the second micromirror 120. For example, if color filter 110 is green, pixel 90A will appear green, if color filter 110 is red, pixel 90A will appear red, and if color filter 110 is blue, pixel 90A will appear blue; the typical RGB colors. However, other color filters could be used. For example, if a yellow filter is used, pixel 90A will appear yellow, thus enhancing the typical RGB palette. The pixel appears as color to the viewer. More generally, in the third state light entering micromirror pixel 90A is reflected back with all color different from that of the color filter filtered out.

Figures 7, 7A:
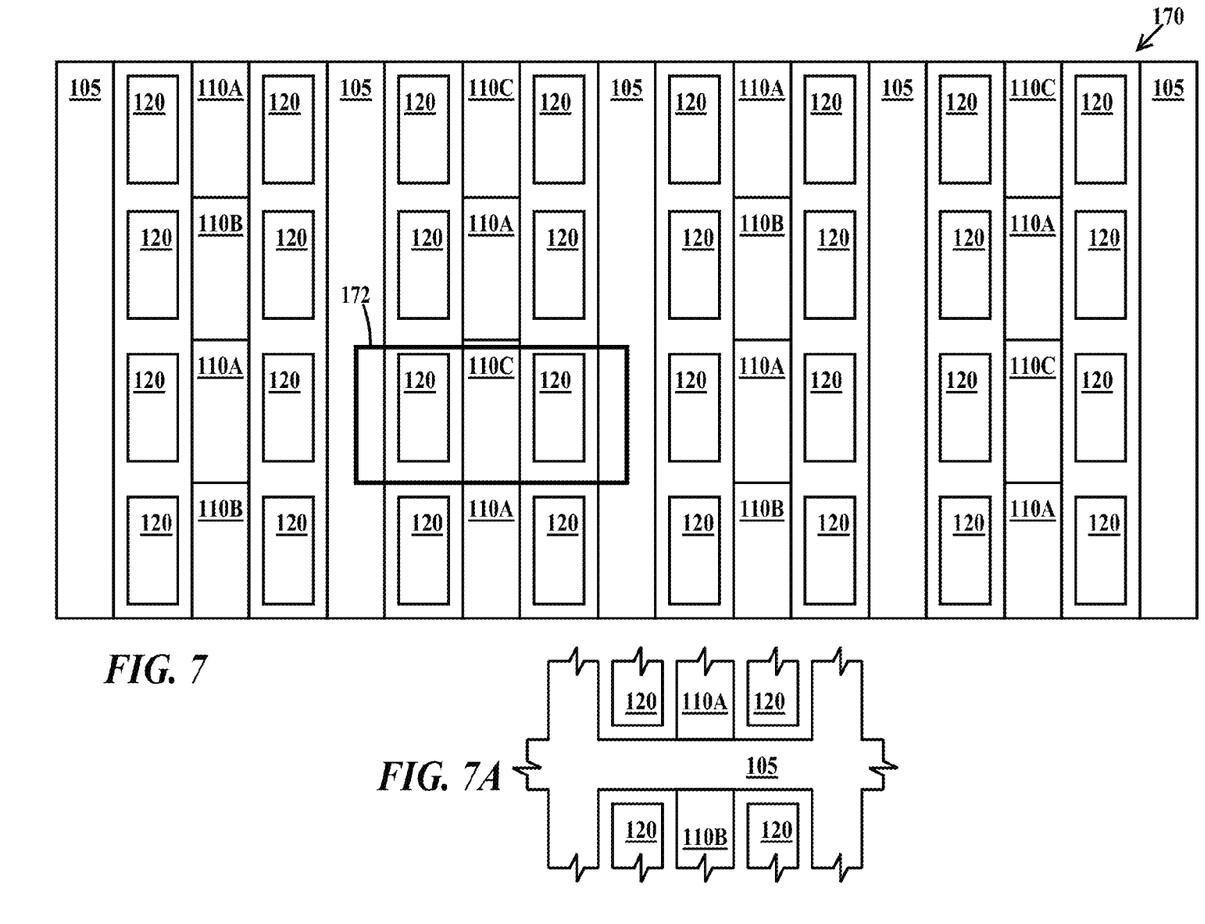
FIGS. 7 and 7A are plan views of an array of tri-state color micromirror pixels of FIG. 1 according to embodiments of the present invention.

FIGS. 7 and 7A are plan views of an array of tri-state color micromirror pixels of FIG. 1 according to embodiments of the present invention. In FIG. 7, an exemplary micromirror array 170 of sixteen micromirror pixels is illustrated; each micromirror pixel includes two micromirrors 120 on opposite sides of a colored filter and a portion of a black filter 105 adjacent to each micromirror. In actual devices, there are many more micromirror pixels than sixteen. The heavy line outlines an exemplary red micromirror pixel 172. Black filters 105 run only columnwise. Optionally, rows of black filters may be placed between rows of micromirror pixels (abutting the color filters of two adjacent micromirror pixels in the same column) to collect scattered light as in FIG. 7A.

Figure 8:
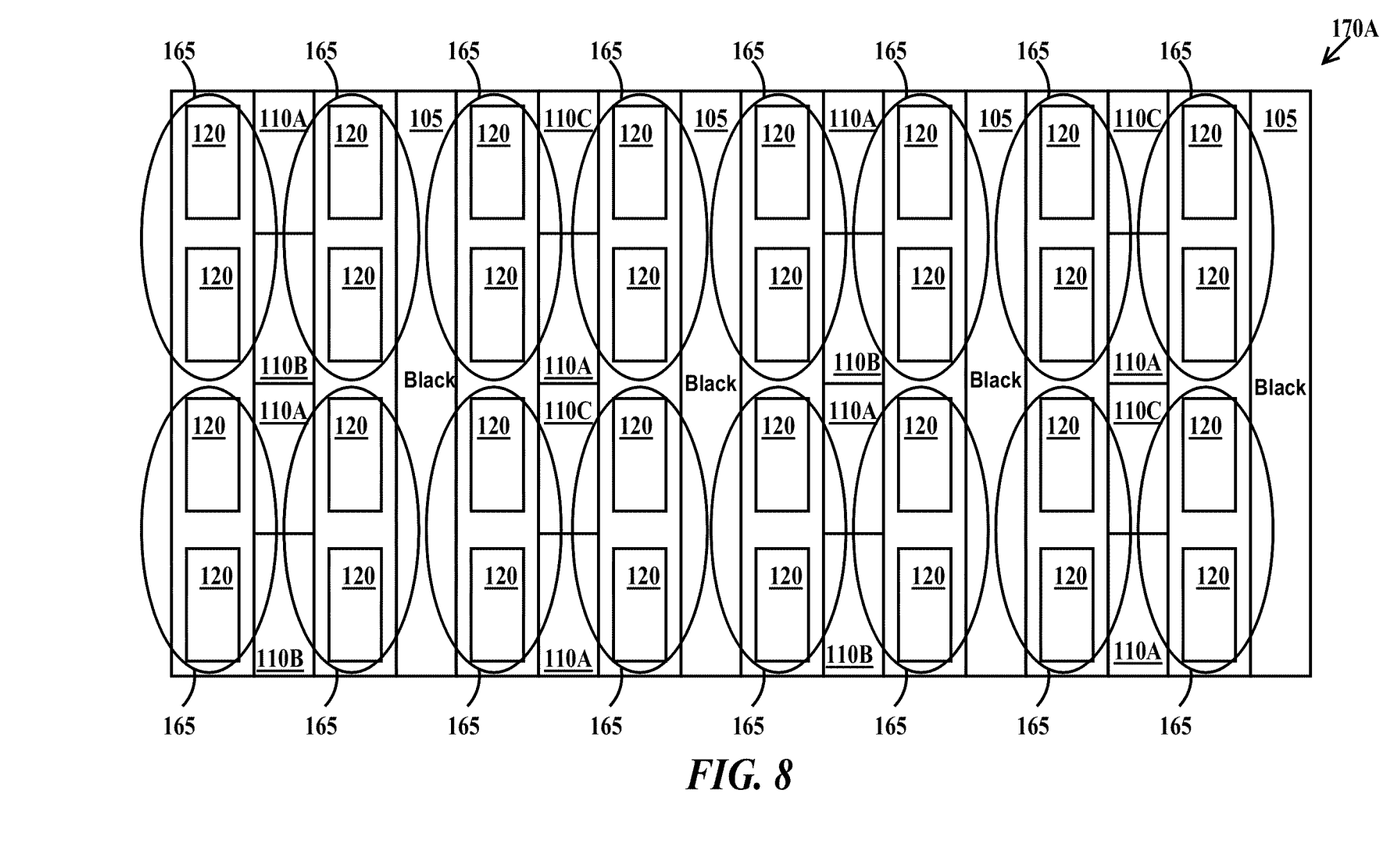
FIG. 8 is a plan view of a array of bi-state color micromirror pixels of FIGS. 6A, 6B and 6C according to an embodiment of the present invention.

FIG. 8 is a plan view of an array of tri-state color micromirror pixels of FIGS. 6A, 6B and 6C according to an embodiment of the present invention. In FIG. 8, micromirror pixel array 170A is similar to micromirror pixel array 170 of FIG. 7 except optional micro-lenses 165 are illustrated. In FIG. 7, micro-lenses are oval and overlay portions of two micromirror pixels in the same column. In alternative embodiments, the micro-lenses may overlay a single or more than two micromirror pixels. In alternative embodiments, the micro-lenses may be round or barrel shaped.

Figure 9A:
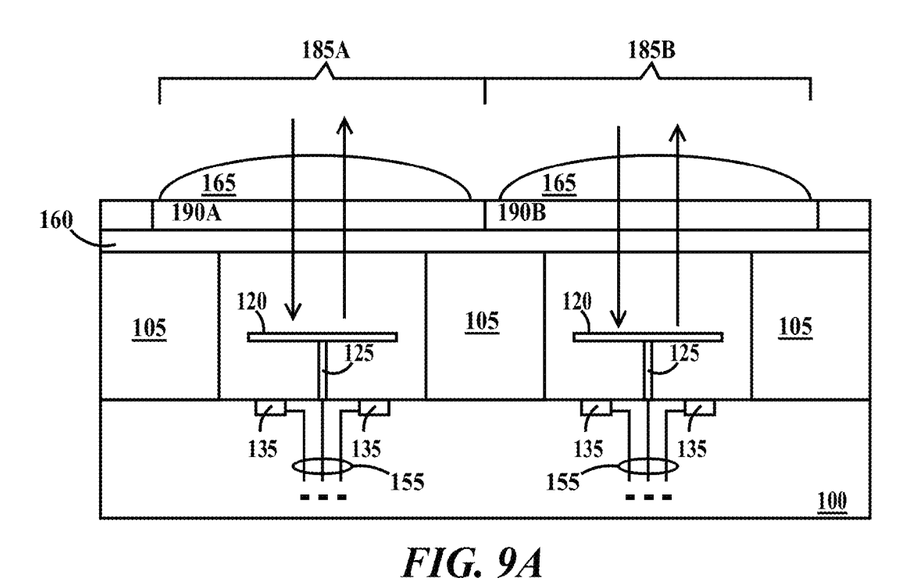
FIGS. 9A and 9B are cross-sections through a second tri-state color micromirror pixel according to an embodiment of the present invention.
Figure 9B:
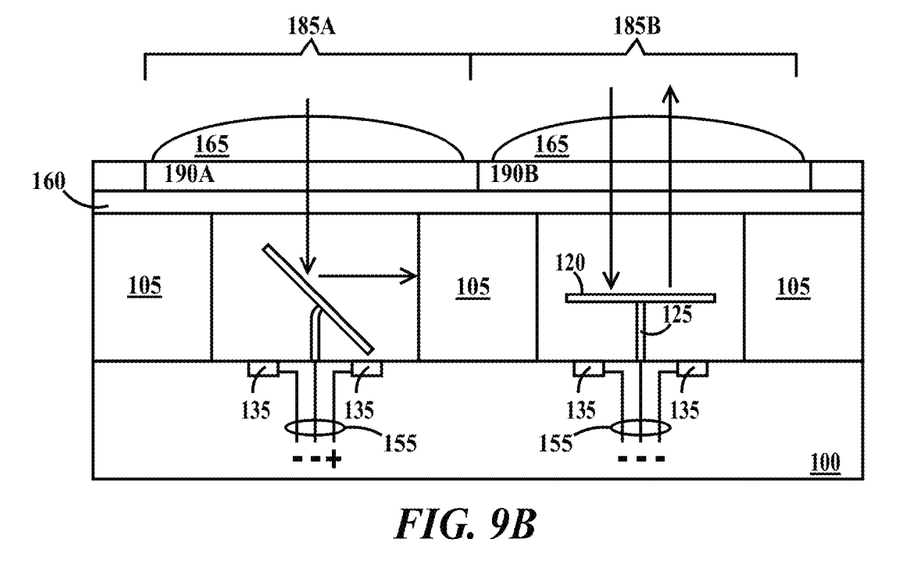

FIGS. 9A and 9B are cross-sections through a bi-state color micromirror pixel according to an embodiment of the present invention. FIGS. 9A and 9B are similar to FIGS. 6A, 6B and 6C except color filter 110 is replaced with a black filter 105, color filters 190A and 190B are placed between micro-lenses 165 and cover plate 160 and two micromirror pixels 185A and 185B are illustrated. In FIG. 9A, both micromirrors are set to have a color response. In FIG. 9B, micromirror pixel 185A is set to have a black response and micromirror 185B is set to have a color response. There is no white response. Operation and dimensions of micromirror pixels 185A and 185B is similar to that described supra with respect to FIGS. 6A, 6B and 6C and the options as to electrode positioning, micromirror suspension described supra with respect to FIGS. 3A, 3B and 4 are applicable to micromirror pixels 185A and 185B. Optionally, only one electrode 135 needs to be associated with each micromirror 120, though two are preferred for physical stability of the micromirror position.

Each pixel of an array of such pixels as illustrated in FIGS. 9A and 9B will have only black or colored responses and no white response so an array of such pixels will have only black or colored responses. Alternatively, by including clear transparent filters on some pixels instead of color filters, a pixel with only white and black responses may be formed. While the array will have white, black and colored responses, no single pixel with black, white and colored responses is possible.

Figure 10:
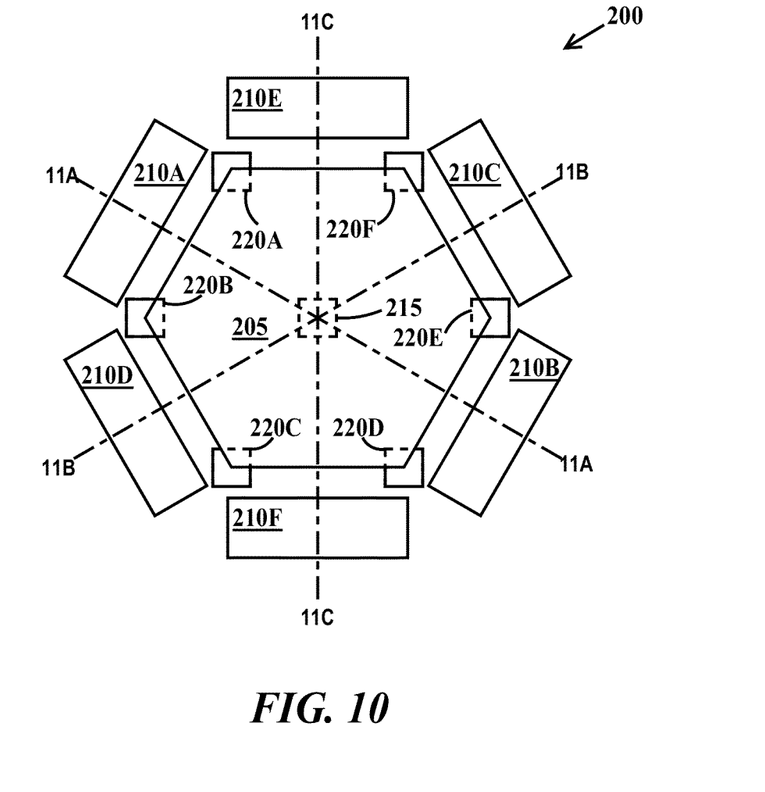
FIG. 10 is a plan view of a multi-state color micromirror pixel according to an embodiment of the present invention.

FIG. 10 is a plan view of a multi-state color micromirror pixel according to an embodiment of the present invention. In FIG. 10 an electrically conductive hexagonal mirror 205 is supported by an electrically conductive flexible member 225 and includes electrodes 220A, 220B, 220C, 220D, 220E and 220F positioned under and proximate to the corners of micromirror 220. Alternatively, the electrodes may be positioned under the sides of micromirror 220. In both cases there will be six electrodes. Adjacent to a first side of micromirror 220 is a yellow reflector 210A. Adjacent to a second side of micromirror 220 is a white reflector 210B. Adjacent to a third side of micromirror 220 is a black reflector 210C. Adjacent to a fourth side of micromirror 220 is a blue reflector 210D. Adjacent to a fifth side of micromirror 220 is a red reflector 210E. Adjacent to a sixth side of micromirror 220 is a green reflector 210F. Yellow reflector 210A is opaque and reflects yellow light and absorbs all other colors of light. White reflector 210B is opaque and reflects all colors of light. Black reflector 210C is opaque and absorbs all colors of light. Blue reflector 210D is opaque and reflects blue light and absorbs all other colors of light. Red reflector 210E is opaque and reflects red light and absorbs all other colors of light. Green reflector 210F is opaque and reflects green light and absorbs all other colors of light. In one example, reflectors 210A, 210B, 210C, 210D, 210E and 210F are comprised of colored opaque photoresist (e.g., photoresist to which particles of pigment has been added to reflect certain wavelengths of light). In one example, reflectors 210A, 210B, 210C, 210D, 210E and 210F are comprised of colored transparent photoresist (e.g., photoresist to which dye has been added to transmit certain wavelengths of light) coated onto opposite sides of a two sided mirror. In one example, black reflector 210 may be comprised of a photoresist that includes a dye that absorbs all colors of light.

Figure 11A:
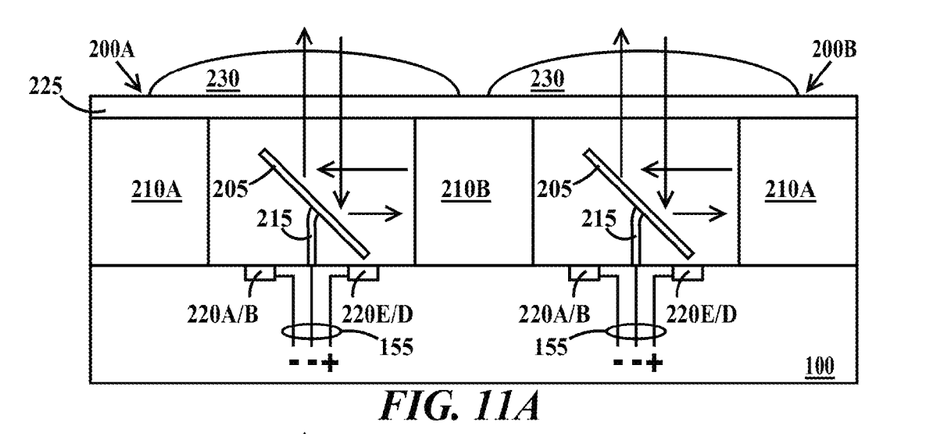
FIGS. 11A, 11B and 11C illustrate respectively, first, second and third tilted states of the multi-state color micromirror pixel of FIG. 10.
Figure 11B:
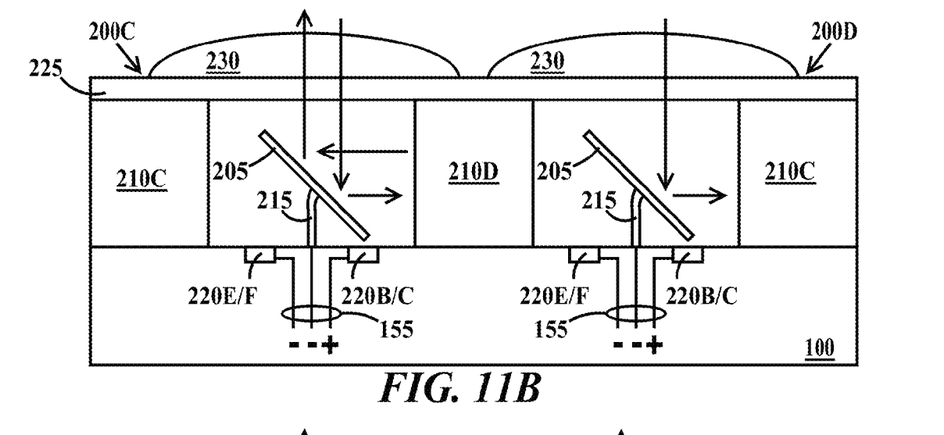
Figure 11C:
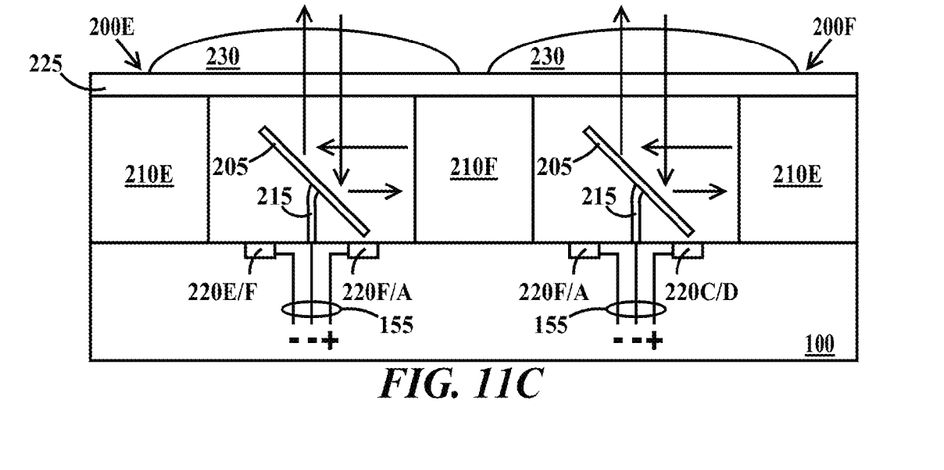

FIGS. 11A, 11B and 11C are cross-sections through lines 11A-11A, 11B-11B and 11C-11C respectively and illustrate respective, first and second, third and fourth, and fifth and sixth tilted states of multi-state color micromirror pixel 200 of FIG. 10. FIGS. 11A, 11B and 11C are similar to FIGS. 6A, 6B and 6C except color filter 110 is replaced with a black filter 105, color and black filters are replaced with color reflectors and two adjacent micromirror pixels along respective lines 11A-11A, 11B-11B and 11C-11C of FIG. 10 are illustrated. In FIG. 11A, micromirror 205 of micromirror pixel 200A is set to have white response though it can also have a yellow response and micromirror 205 of micromirror pixel 200B is set to have a yellow response, though it can also have a white response. In FIG. 11B, micromirror 205 of micromirror pixel 200C is set to have blue response though it can also have a black response and micromirror 205 of micromirror pixel 200D is set to have a black response, though it can also have a blue response. In FIG. 11C, micromirror 205 of micromirror pixel 200E is set to have green response though it can also have a red response and micromirror 205 of micromirror pixel 200F is set to have a red response, though it can also have a green response. In FIGS. 11A, 11B and 11C micromirror pixels 200A, 200B, 200C, 200D, 200E and 200F can also have a white response by not being tilted. Thus micromirror pixels 200A and 200B have two responses from three micromirror states and micromirror pixels 200C, 200D, 200E and 200F have three responses from three micromirror states.

Operation and dimensions of micromirror pixels 200A, 200B, 200C, 200D, 200E and 200F is similar to that described supra with respect to FIGS. 6A, 6B and 6C and the options as to electrode positioning, micromirror suspension described supra with respect to FIGS. 3A, 3B and 4 are applicable to micromirror pixels 200A, 200B, 200C, 200D, 200E and 200F. However, the voltages applied to the electrodes are applied to two groups of electrodes 220. For example, for micromirror pixel 200A of FIG. 11A, a first voltage (e.g., a negative voltage) is applied to electrodes 220A, 220B, 220C, and 220F as well as to flexible member 215 and a second voltage (e.g., a positive voltage) is applied to electrodes 220E and 220D.

While FIGS. 10, 11A, 11B and 11C illustrate a micromirror pixel 200 having six sides, a non-tilted state, six titled states and six reflectors, more generally the micromirror may have n sides, n tilted states and n reflectors where n is an integer equal to or greater than 3, with 4 and 6 preferred because of the more compact layouts possible.

Figure 12:
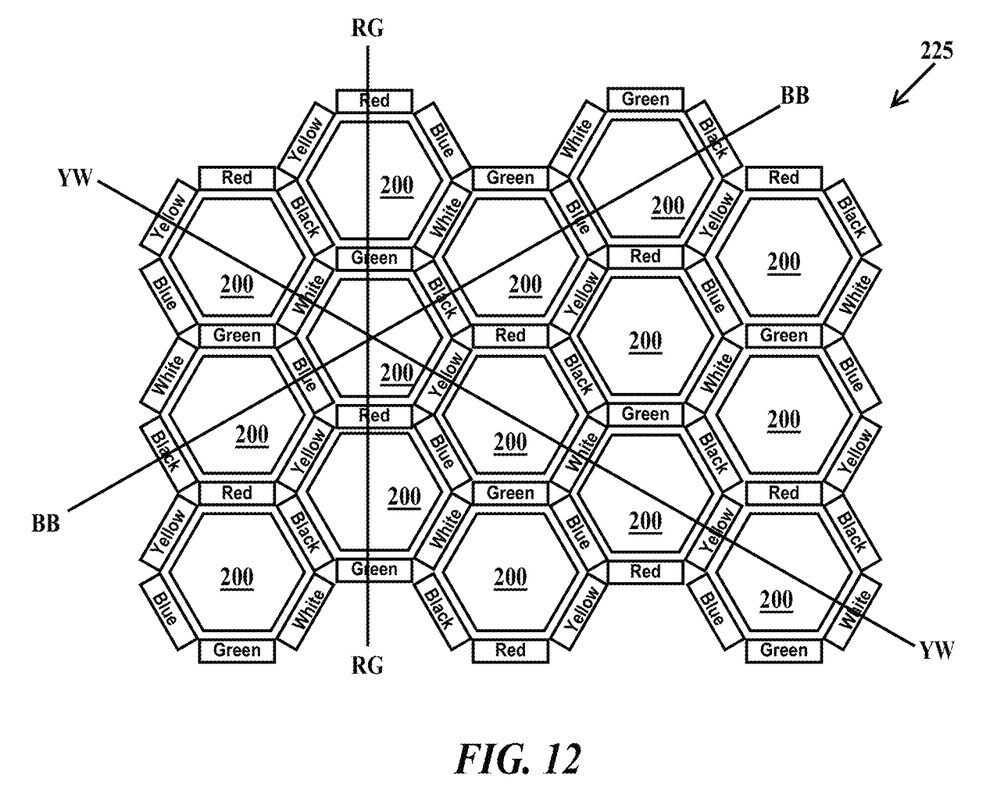
FIG. 12 is a plan view of an array of multi-state color micromirror pixels of FIG. 10 according to an embodiment of the present invention.

FIG. 12 is a plan view of an array of six-state color micromirror pixels of FIG. 10 according to an embodiment of the present invention. In FIG. 12, an exemplary micromirror array 225 of fifteen micromirror pixels 200 is illustrated. Along an axis YW (which corresponds to line 11A-11A of FIG. 10) and all parallel axes passing through centers of adjacent micromirrors the reflectors alternate between yellow and white. Along an axis BB (which corresponds to line 11B-11B of FIG. 10) and all parallel axes passing through centers of adjacent micromirrors the reflectors alternate between black and blue. Along an axis RG (which corresponds to line 11C-11C of FIG. 10) and all parallel axes passing through centers of adjacent micromirrors the reflector alternate between red and green. In actual devices, there are many more micromirror pixels than fifteen.

Figure 13:
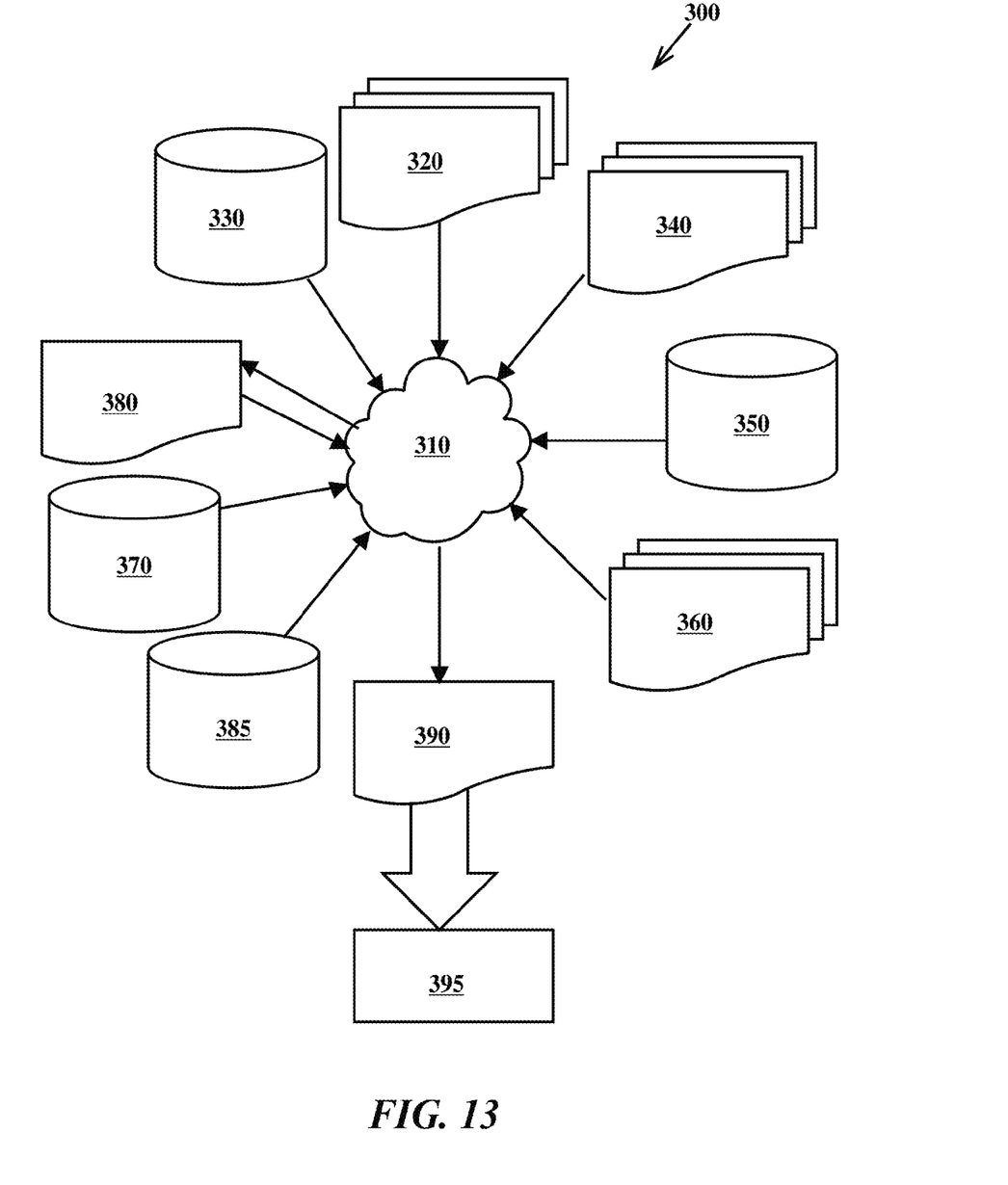
FIG. 13 is a flow diagram of a design process used in semiconductor design, manufacture, and/or test.

FIG. 13 is a flow diagram of a design process used in semiconductor design, manufacture, and/or test. FIG. 13 illustrates multiple such design structures including an input design structure 320 that is preferably processed by a design process 310. In one embodiment, an input design structure 320 comprises design data used in a design process and comprising information describing an embodiment of the invention with respect to multi-state color micromirror pixels as shown in FIGS. 1, 2A, 2B, 3A, 3B, 4, 5A, 5B, 6A, 6B, 6C, 7, 7A, 8, 9A, 9B, 10, 11A, 11B, 11C and 12. The design data in the form of schematics or HDL, a hardware description language (e.g., Verilog, VHDL, C, etc.) may be embodied on one or more machine-readable media. For example, input design structure 320 may be a text file, numerical data or a graphical representation of an embodiment of the invention as shown in FIGS. 1, 2A, 2B, 3A, 3B, 4, 5A, 5B, 6A, 6B, 6C, 7, 7A, 8, 9A, 9B, 10, 11A, 11B, 11C and 12. Input design structure 320 may be a logical simulation design structure generated and processed by design process 310 to produce a logically equivalent functional representation of a hardware device. Input design structure 320 may also or alternatively comprise data and/or program instructions that when processed by design process 310, generate a functional representation of the physical structure of a hardware device. Whether representing functional and/or structural design features, input design structure 320 may be generated using electronic computer-aided design (ECAD) such as implemented by a core developer/designer. When encoded on a machine-readable data transmission, gate array, or storage medium, input design structure 320 may be accessed and processed by one or more hardware and/or software modules within design process 310 to simulate or otherwise functionally represent an electronic component, circuit, electronic or logic module, apparatus, device, or system such as those shown in FIGS. 1, 2A, 2B, 3A, 3B, 4, 5A, 5B, 6A, 6B, 6C, 7, 7A, 8, 9A, 9B, 10, 11A, 11B, 11C and 12. As such, input design structure 320 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware description language (HDL) design entities or other data structures conforming to and/or compatible with lower-level HDL design languages such as Verilog and VerilogHDL (VHDL), and/or higher-level design languages such as C or C++.

Design process 310 preferably employs and incorporates hardware and/or software modules for synthesizing, translating, or otherwise processing a design/simulation functional equivalent of the components, circuits, devices, or logic structures shown in FIGS. 1, 2A, 2B, 3A, 3B, 4, 5A, 5B, 6A, 6B, 6C, 7, 7A, 8, 9A, 9B, 10, 11A, 11B, 11C and 12 to generate a netlist 380 which may describe design structures such as input design structure 320. Netlist 380 may comprise, for example, compiled or otherwise processed data structures representing a list of wires, discrete components, logic gates, control circuits, I/O devices, models, etc. that describes the connections to other elements and circuits in an integrated circuit design. Netlist 380 may be synthesized using an iterative process in which netlist 380 is re-synthesized one or more times depending on design specifications and parameters for the device. As with other design structure types described herein, netlist 380 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 310 may include hardware and software modules for processing a variety of data structure types including netlist 380. Such data structure types may reside, for example, within library elements 330 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 340, characterization data 350, verification data 360, design rules 370, and test data files 385 which may include input test patterns, output test results, and other testing information. Design process 310 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 310 without deviating from the scope and spirit of the invention. Design process 310 may also include modules for performing standard circuit design processes such as timing analysis, verification, design rule checking, place and route operations, etc.

Design process 310 employs and incorporates logic and physical design tools such as HDL compilers and simulation model build tools to process design structure 320 together with some or all of the depicted supporting data structures along with any additional mechanical design or data (if applicable), to generate a second design structure 390 comprising second design data embodied on a storage medium in a data format used for the exchange of layout data of integrated circuits and/or symbolic data format (e.g. information stored in a GDSII (Graphic Data System II) (GDS2), GL1 (Graphic Language 1), Organization for the Advancement of Structured Information Standards (OASIS) format (formerly known as (Standard Generalized Mark-up Language) SGML Open), map files, or any other suitable format for storing such design structures). In one embodiment, the second design data resides on a storage medium or programmable gate array in a data format used for the exchange of data of mechanical devices and structures (e.g. information stored in an Initial Graphics Exchange Specification (IGES), Drawing Exchange Format (DXF), Parasolid XT, JT, (Digital Raster Graphics) DRG, or any other suitable format for storing or rendering such mechanical design structures). Output design structure 390 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1, 2A, 2B, 3A, 3B, 4, 5A, 5B, 6A, 6B, 6C, 7, 7A, 8, 9A, 9B, 10, 11A, 11B, 11C and 12. In one embodiment, output design structure 390 may comprise a compiled, executable HDL simulation model that functionally simulates the devices shown in FIGS. 1, 2A, 2B, 3A, 3B, 4, 5A, 5B, 6A, 6B, 6C, 9A, 9B, 10, 11A, 11B, 11C and 12.

Output design structure 390 may also employ a data format used for the exchange of layout data of integrated circuits and/or symbolic data format (e.g. information stored in a GDSII (GDS2), GL1, OASIS, map files, or any other suitable format for storing such design data structures). Output design structure 390 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1, 2A, 2B, 3A, 3B, 4, 5A, 5B, 6A, 6B, 6C, 7, 7A, 8, 9A, 9B, 10, 11A, 11B, 11C and 12. In one example, output design structure 390 is in the form of a netlist. Output design structure 390 may then proceed to an output stage 395 where, for example, output design structure 390 proceeds to tape-out, is released to manufacturing, is released to a mask house, is sent to another design house, is sent back to the customer, etc.

Figure 14:
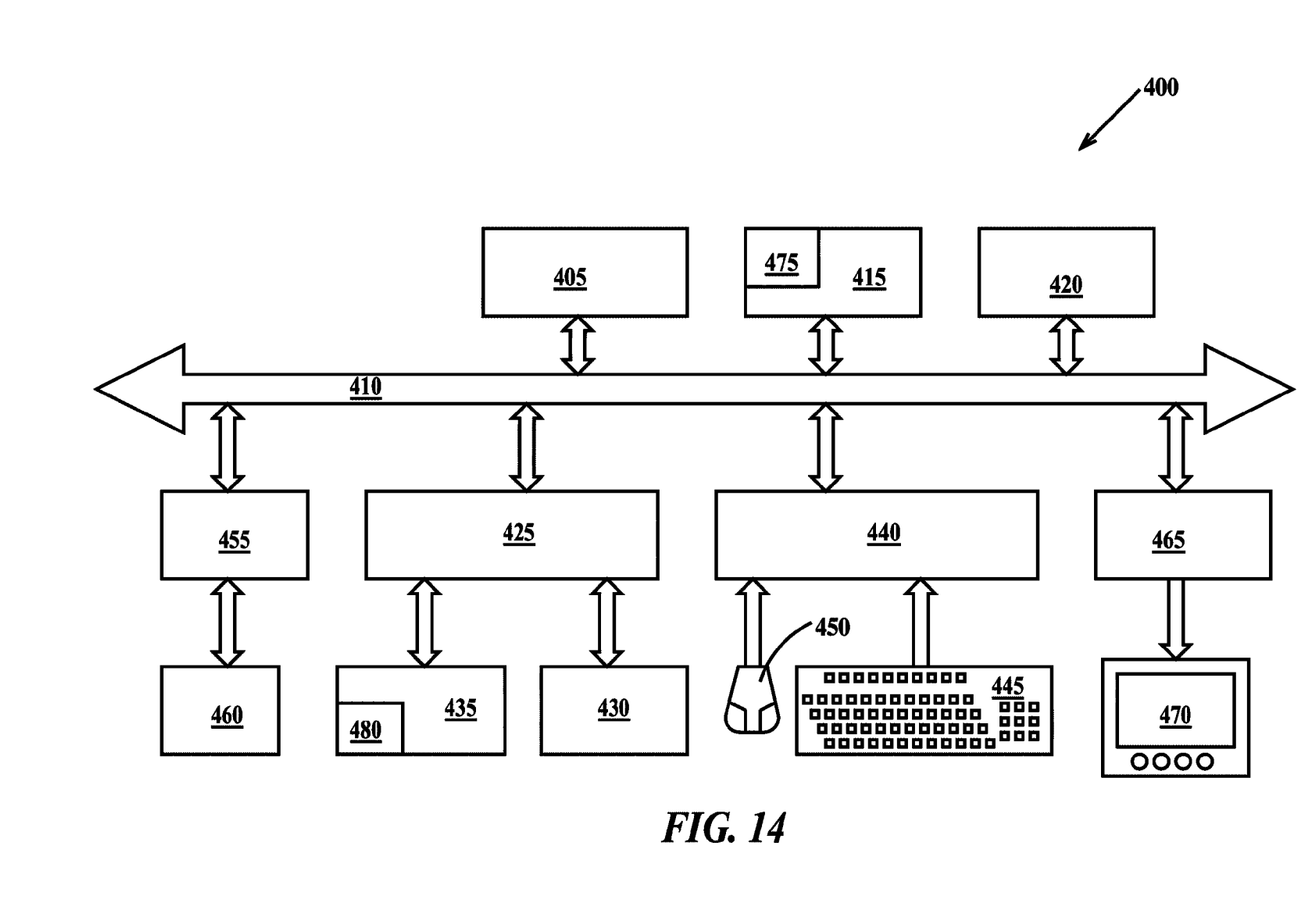
FIG. 14 is a schematic block diagram of a general-purpose computer.

Generally, the method described herein with respect to the design process of FIG. 14 is practiced with a general-purpose computer described supra may be coded as a set of instructions on removable or hard media for use by the general-purpose computer.

FIG. 14 is a schematic block diagram of a general-purpose computer. In FIG. 14, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include electronic, magnetic, optical, electromagnetic, infrared, and semiconductor devices. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for the computer program created to run the present invention is loaded on the appropriate removable data and/or program storage device 430, fed through data port 460 or typed in using keyboard 445.

Thus, the embodiments of the present invention provide micromirrors for an electronic color paper that has low power usage and high contrast as well as a design structure for the micromirrors for an electronic color paper.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. For example, while the terms "light" and "color" and "transparent" and "opaque" are intended to refer to light of wavelengths visible to the human eye, the invention is not limited to such wavelengths.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Therefore, it is intended that the following claims cover all such modifications and changes as fall within the true spirit and scope of the invention.

What is claimed is:

1. A direct view display, comprising:
    an array of micromirrors and first and second filters formed on a top surface of a substrate, each micromirror of said array of micromirrors having a top surface that reflects light, each micromirror of said array of micromirrors positioned between a respective fixed first filter that absorbs white light and a respective fixed second filter that transmits color light of selected wavelengths, said first filter comprising a first block of a first light absorbing material and second filter comprising a second block of a second light absorbing material, said first and second blocks and said micromirror arranged in a straight line parallel to said top surface of said substrate, said top surface of said micromirror recessed below top surfaces of said first and second blocks, each micromirror of said array of micromirrors (i) having a non-tilted first state that reflects incident light back toward the source of said incident light, (ii) tiltable to a second state to reflect incident light into said first filters and (iii) tiltable to a third state to reflect incident light through said second filters.

2. The direct view display of claim 1, wherein in said non-tilted states, said top surfaces of said micromirrors are parallel to said top surface of said substrate.

3. The direct view display of claim 1, wherein said micromirrors are electrically conductive, said substrate includes first electrodes positioned between a bottom surface of said micromirrors and proximate to first sides of said micromirrors and second electrodes positioned between said bottom surface of said micromirrors and proximate to second and opposite sides of said micromirrors, said micromirrors tiltable to said second state when different polarity voltages are applied to said micromirrors and said first electrodes and tiltable to said third state when different polarity voltages are applied to said micromirrors and said second electrodes.

4. The direct view display of claim 1, further including:
    a transparent cover plate supported by said first and second filters, said micromirrors positioned between said cover plate and said substrate.

5. The direct view display of claim 4, further including an array of micro-lenses on said cover plate, each micro-lens of said array of micro-lenses positioned over at least one respective micromirror.

6. The direct view display of claim 1, wherein said second filters include at least two sets of filters that transmit color light of different ranges of selected wavelengths of light.

7. The direct view display of claim 1, wherein each pixel of said direct view display comprises a first micromirror between a filter that absorbs white light and a filter that transmits color light and a second micromirror between said filter that transmits color light and an additional filter that absorbs white light.

8. The direct view display of claim 7, wherein both said first and second micromirrors are configured to tilt toward said second filter in said third states of said first and second micromirrors.

9. A direct view display, comprising:
    an array of micromirrors and first filters formed on a top surface of a substrate each micromirror of said array of micromirrors having a top surface that reflects light and positioned between a corresponding pair of first filters that absorb white light; and
    an array of second filters that transmits color light of selected wavelengths, each second filter of said array of second filters positioned over said top surfaces of respective micromirrors of said array of micromirrors, each of said micromirrors of said array of micromirrors (i) having a non-tilted first state that reflects incident light back toward the source of said incident light through a respective second filter and (ii) tiltable to a second state to reflect incident light into a respective first filter.

10. The direct view display of claim 9 wherein in said non-tilted states, said top surfaces of said micromirrors are parallel to said top surface of said substrate.

11. The direct view display of claim 9, wherein said micromirrors are electrically conductive, said substrate includes first electrodes positioned between a bottom surface of said micromirrors and proximate to first sides of said micromirrors and second electrodes positioned between said bottom surface of said micromirrors and proximate to second and opposite sides of said micromirrors, said micromirrors tiltable to said second state when different polarity voltages are applied to said micromirrors and said first electrodes.

12. The direct view display of claim 9, further including:
a transparent cover plate between said second filters and said micromirrors;
said transparent cover plate supported by said first filters, said micromirrors positioned between said cover plate and said substrate.

13. The direct view display of claim 12, further including:
an array of micro-lenses on over said second filters, each micro-lens of said array of micro-lenses positioned over at least one respective micromirror.

14. The direct view display of claim 9, wherein said second filters include at least two sets of filters that transmit color light of different ranges of selected wavelengths of light.

15. A direct view display, comprising an array of micromirror pixels each micromirror pixel of said array of micromirror pixels comprising:
a micromirror formed on a top surface of a substrate, said micromirror having a top surface that reflect light and having n sides, where n is equal to or greater than three; and
n reflectors formed on a top surface of a substrate, each of said n reflectors positioned proximate to a respective side of said micromirror, each of said n reflectors independently configured to reflect color light of selected wavelengths or absorb white light, each micromirror of said array of micromirrors (i) having a non-tilted first state that reflects incident light back toward the source of said incident light and (ii) tiltable to n additional states to reflect incident light onto one of said n reflectors in each of said n states.

16. The direct view display of claim 15, wherein in said non-tilted states, said top surfaces of said micromirrors are parallel to said top surfaces of said substrate.

17. The direct view display of claim 15, wherein:
said micromirrors are electrically conductive; and
said substrate includes n electrodes positioned between a bottom surface of said micromirrors and proximate to respective corners of said micromirrors, said micromirrors tiltable to a different state of said n states when different polarity voltages are applied to said micromirrors and different pairs of electrodes; or
said substrate includes n electrodes positioned between a bottom surface of said micromirrors and proximate to respective sides of said micromirrors, said micromirrors tiltable to a different state of said n states when different polarity voltages are applied to said micromirrors and different electrodes.

18. The direct view display of claim 15, further including:
a transparent cover plate supported by said n reflectors, said micromirrors positioned between said cover plate and said substrate.

19. The direct view display of claim 18, further including an array of micro-lenses on said cover plate, each micro-lens of said array of micro-lenses positioned over a respective micromirror.

20. The direct view display of claim 15, wherein said n-reflectors include n−1 reflectors that reflect different ranges of selected wavelengths of light and one reflector that absorbs white light.

* * * * *